(12) United States Patent
Ganon et al.

(10) Patent No.: US 12,481,509 B2
(45) Date of Patent: Nov. 25, 2025

(54) HIBERATE (HIB8) EXIT TIME FOR UNIVERSAL FLASH STORAGE (UFS) DEVICES BY MONITORING WHEN TO ENABLE OR DISABLE LOW POWER STATES WITHOUT WAITING ON SQUELCH DETECTION

(71) Applicant: Sandisk Technologies, Inc., Milpitas, CA (US)

(72) Inventors: Doron Ganon, Kfar Vradim (IL); Eitan Lerner, Karmiel (IL)

(73) Assignee: Sandisk Technologies, Inc., Milpitas, CA (US)

( * ) Notice: Subject to any disclaimer, the term of this patent is extended or adjusted under 35 U.S.C. 154(b) by 37 days.

(21) Appl. No.: 18/353,861

(22) Filed: Jul. 17, 2023

(65) Prior Publication Data

US 2024/0152362 A1 May 9, 2024

Related U.S. Application Data (60) Provisional application No. 63/423,633, filed on Nov. 8, 2022.

(51) Int. Cl.
*G06F 9/4401* (2018.01)
*G06F 1/04* (2006.01)

(52) U.S. Cl.
CPC .............. *G06F 9/4418* (2013.01); *G06F 1/04* (2013.01)

(58) Field of Classification Search
CPC .................................. G06F 1/04; G06F 9/4418
See application file for complete search history.

(56) References Cited

U.S. PATENT DOCUMENTS

| | | | |
|---|---|---|---|
| 8,188,764 B2 | 5/2012 | Weiss et al. | |
| 9,063,728 B2 * | 6/2015 | Wakrat | G06F 12/02 |
| 9,069,551 B2 * | 6/2015 | Iarovici | G06F 1/3275 |
| 9,454,218 B2 | 9/2016 | Guddeti et al. | |
| 9,459,687 B2 | 10/2016 | Park et al. | |
| 9,513,662 B2 * | 12/2016 | Chin | G06F 13/4282 |
| 10,209,911 B2 * | 2/2019 | Chin | G06F 3/0673 |
| 10,666,419 B2 * | 5/2020 | Kim | H04L 7/0079 |
| 10,891,078 B2 | 1/2021 | Brief et al. | |
| 11,726,677 B2 * | 8/2023 | Noh | G06F 3/0679 |
| | | | 711/154 |
| 12,061,510 B2 * | 8/2024 | Raheja | G06F 1/3234 |

(Continued)

FOREIGN PATENT DOCUMENTS

KR 20210132569 A 11/2021

*Primary Examiner* — Tammara R Peyton
(74) *Attorney, Agent, or Firm* — Patterson + Sheridan, LLP (57) ABSTRACT

Rather than waiting on a squelch to detect the difference in the state from steady to floating, this disclosure suggests using the time from when a reference clock is turned on to begin the process to exit the hibernation state. The reference clock is turned off while a data storage device is in the hibernation state to save power. Once the host is ready for the device to exit the hibernation state, the reference clock is turned on. The reference clock is monitored for the change. Once the reference clock is on, the data storage device returns to a steady state. In the ready state, the data storage device has a shortened ready time. Once the ready time is complete, the data storage device may now exit the hibernation state without waiting on squelch detection or a hibernation exit request from the host.

20 Claims, 8 Drawing Sheets (56) References Cited

U.S. PATENT DOCUMENTS

| | | |
|---|---|---|
| 2013/0166932 A1 | 6/2013 | Iarovici et al. |
| 2016/0231958 A1* | 8/2016 | Chin ..................... G06F 3/0653 |
| 2019/0280848 A1 | 9/2019 | Kim et al. |
| 2020/0241625 A1 | 7/2020 | Boenapalli et al. |
| 2020/0341825 A1 | 10/2020 | Sudarmani et al. |
| 2020/0409448 A1 | 12/2020 | He et al. |
| 2021/0004176 A1 | 1/2021 | Seo |
| 2021/0334225 A1 | 10/2021 | Seo et al. |

* cited by examiner

Table 5 $T_{HBERN8}$ and $T_{ACTIVATE}$ Capabilities and Parameters

| Attribute or Parameter | Value | Units |
|---|---|---|
| RX_Advanced_Granularity_Capability | 4, 8, 16, 32 | μs |
| RX_Advanced_Hibern8Time_Capability | 1 to 128 | n/a |
| RX_Advanced_Min_ActivateTime_Capability | 1 to 14 | n/a |
| RX_Min_ActivateTime_Capability | 1 to 4 | 100 μs |
| TX_Advanced_Granularity | 1 to 15 | n/a |
| TX_Advanced_Granularity_Capability | 4, 8, 16, 32 | μs |
| TX_Advanced_Hibern8Time_Capability | 1 to 128 | n/a |
| TX_Min_ActivateTime | If (Tx_ResetMode = HS_MODE)  1 to 4<br>ELSE<br>1 to 15 | 100 μs |
| $T_{ACTIVATE}$ | If (Rx_Advanced_Granularity_Capability[0] = 1)<br>  $T_{ACTIVATE\_RX}$ =<br>   Min(RX_Min_ActivateTime_Capability * 100,<br>   Rx_Advanced_Min_ActivateTime_Capability *<br>   2 (2 to 10 + RX_Advanced_Graularity_Capability[2:1])<br>ELSE<br>  $T_{ACTIVATE\_RX}$ =<br>   RX_Min_ActivateTime<br>  $T_{ACTIVATE}$ = TX_Advanced_Granularity *<br>END<br>$T_{ACTIVATE\_RX}$ = $T_{ACTIVATE\_RX}$<br>Set TX_Min_ActivateTime or<br>Tx_Advanced_Granularity such that $T_{ACTIVATE}$ condition<br>holds true:<br>If (TX_Advanced_Granularity_Step[0] = 1)<br>  $T_{ACTIVATE}$ = TX_Advanced_Granularity *<br>   2 (2 to 10 + TX_Advanced_Graularity_Step[2:1])<br>ELSE<br>  $T_{ACTIVATE}$ = TX_Min_ActivateTime * 100<br>END<br>If (Rx_Advanced_Granularity_Capability[0] = 1) | μs |

HIBERATE (HIB8) EXIT TIME FOR UNIVERSAL FLASH STORAGE (UFS) DEVICES BY MONITORING WHEN TO ENABLE OR DISABLE LOW POWER STATES WITHOUT WAITING ON SQUELCH DETECTION

CROSS-REFERENCE TO RELATED APPLICATIONS

This application claims benefit of U.S. provisional patent application Ser. No. 63/423,633, filed Nov. 8, 2022, which is herein incorporated by reference.

BACKGROUND OF THE DISCLOSURE

Field of the Disclosure

Embodiments of the present disclosure generally relate to improved hibernate exit time for universal flash storage (UFS) devices.

Description of the Related Art

The hibernate (HIB8) operation is a power mode request sent by the host to place a data storage device into the lowest power consumption level while only small logic remains active. The data storage device remains active to continue monitoring the response to the request of exit by the host. To enter into a HIB8 state, the UFS line goes to a native interface between the host and the data storage device. The high-speed serial interface goes to a deep sleep state also known as a floating mode where there is little data consumption and the reference clock is shut down. The reference clock is the clock signal that is being delivered to the data storage device.

One of the performance topic impacts is the time the data storage device can exit from HIB8 and respond to a new burst of data from the host. In a current approach, as Mobile Industry Processor Interface (MIPI)/Joint Electron Device Engineering Council (JEDEC) specification defines, the exit from HIB8 is enabled by the host first enabling the clock. Once the clock is enabled, a time is defined by T activate. T activate is a timer that may last up to 100 microseconds. The difference in line (DIFF_N) goes from a floating state to a steady state. The flow relies on the squelch inside the analog and logic blocks of the data storage device that consume time in order to detect the HIB8 exit request and prepare the data storage device blocks to be ready for active operation. The data storage device tries to exit HIB8 as quick as possible, but there is a delay in HIB8 exit.

Therefore, there is a need in the art for improved hibernate exit time for UFS devices.

SUMMARY OF THE DISCLOSURE

Rather than waiting on a squelch to detect the difference in the state from steady to floating, this disclosure suggests using the time from when a reference clock is turned on to begin the process to exit the hibernation state. The reference clock is turned off while a data storage device is in the hibernation state to save power. Once the host is ready for the device to exit the hibernation state, the reference clock is turned on. The reference clock is monitored for the change. Once the reference clock is on, the data storage device returns to a steady state. In the ready state, the data storage device has a shortened ready time. Once the ready time is complete, the data storage device may now exit the hibernation state without waiting on squelch detection or a hibernation exit request from the host.

In one embodiment, a data storage device comprises: a memory device; and a controller coupled to the memory device, wherein the controller is configured to: detect a reference clock signal has been activated by a host device; and in response to the detection, exit a hibernation state.

In another embodiment, a data storage device comprises: a memory device; and a controller coupled to the memory device, wherein the controller is configured to: enter a hibernation state at request of a host device, wherein while in the hibernation state a data storage device transmission (Tx) line is floating; detect a reference clock signal is activated; begin to activate data storage device for a data storage device activation time period (T-Activate); execute a burst on the data storage device TX line; and inform the host device that the data storage device has exited the hibernation state.

In another embodiment, a data storage device comprises: memory means; and a controller coupled to the memory means, wherein the controller is configured to: detect a change in a reference clock signal; begin a time to activation (T-Activate) state on a data storage device transmission (Tx) line; execute a burst on the data storage device Tx line; and drive the data storage device Tx line to DIFF_N.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Rather than waiting on a squelch to detect the difference in the state from steady to floating, this disclosure suggests using the time from when a reference clock is turned on to begin the process to exit the hibernation state. The reference clock is turned off while a data storage device is in the hibernation state to save power. Once the host is ready for the device to exit the hibernation state, the reference clock is turned on. The reference clock is monitored for the change. Once the reference clock is on, the data storage device returns to a steady state. In the ready state, the data storage device has a shortened ready time. Once the ready time is complete, the data storage device may now exit the hibernation state without waiting on squelch detection or a hibernation exit request from the host.

Figure 1:
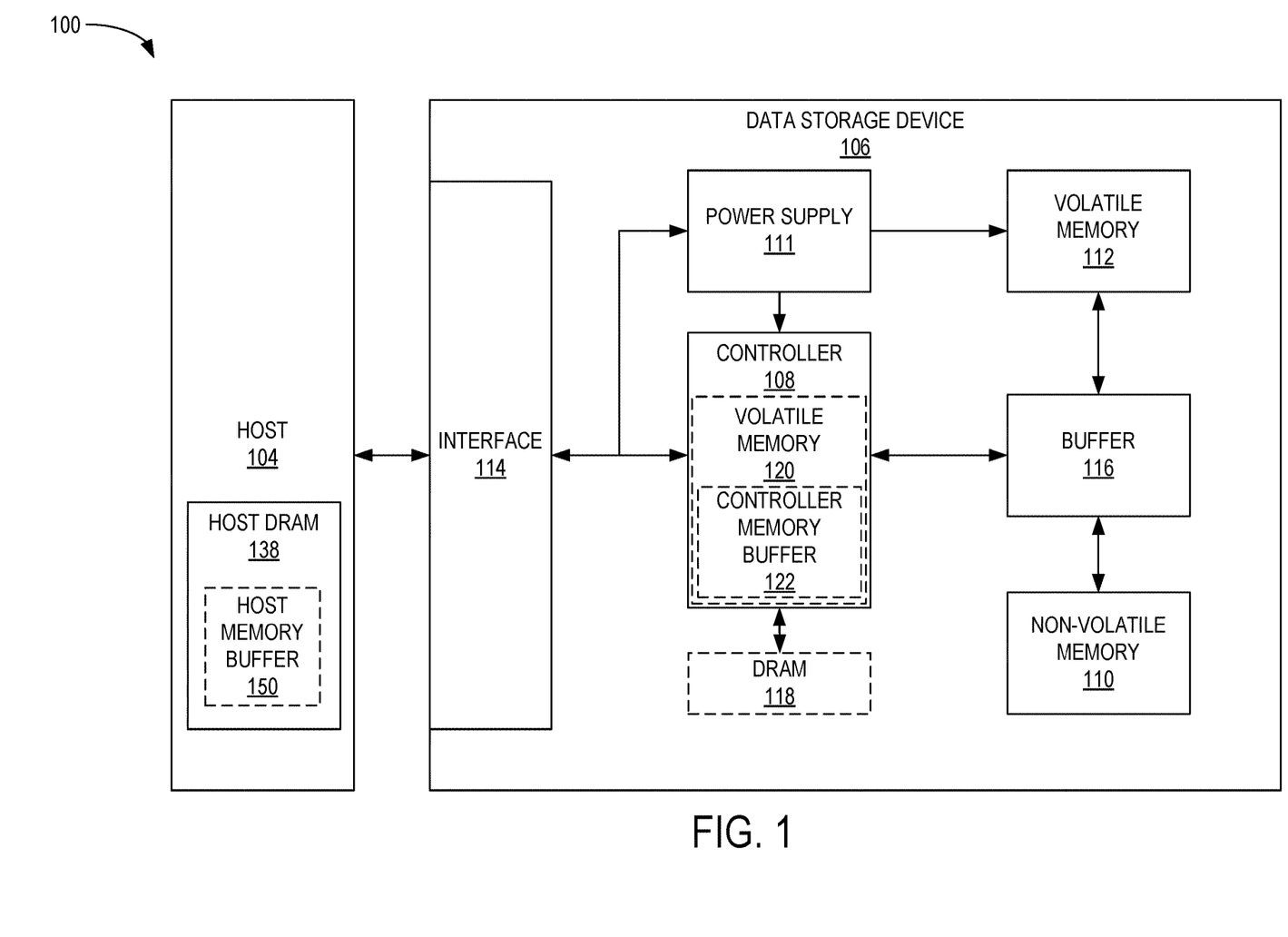
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
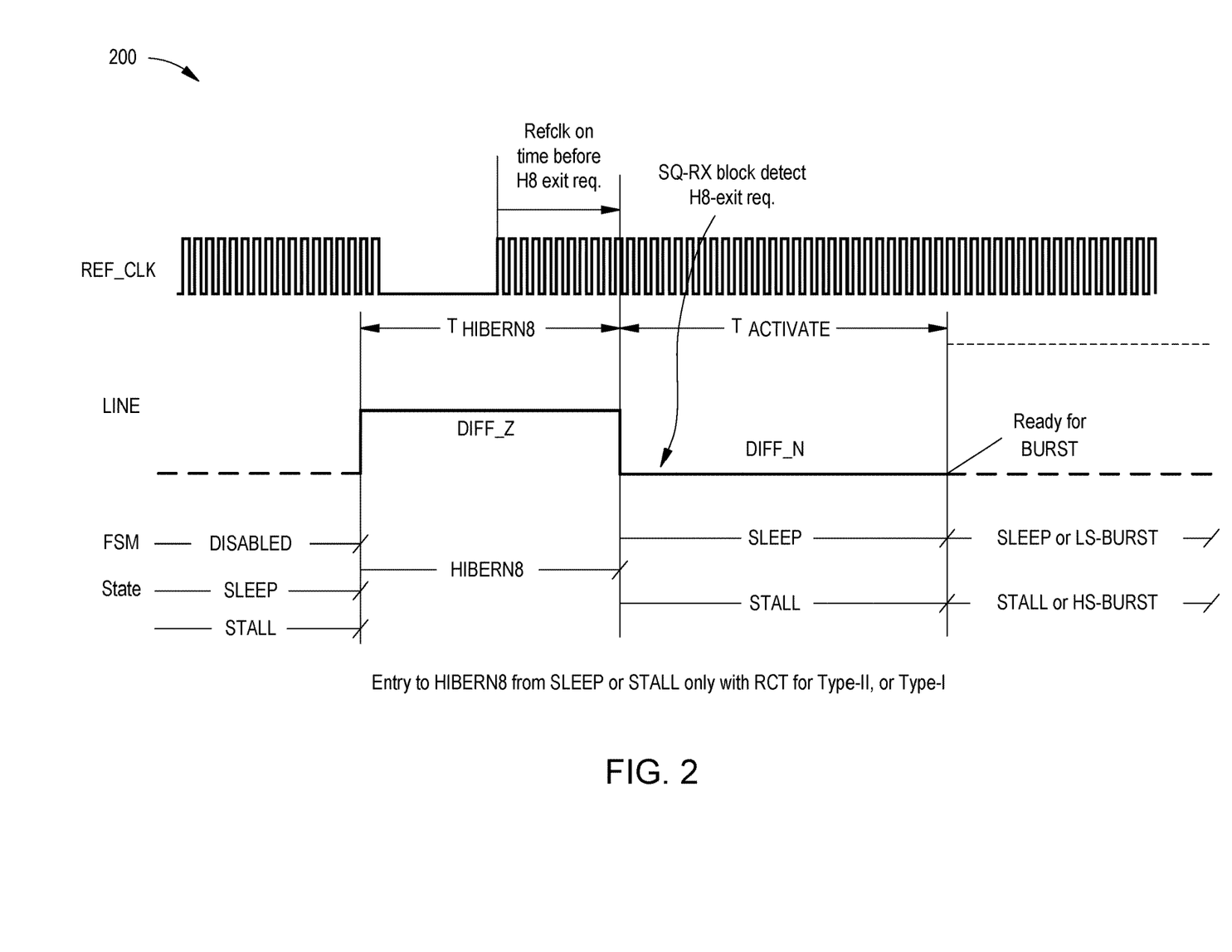
FIG. 2 is diagram illustrating a method for entry to HIB8 and exit from the HIB8, according to certain embodiments.

FIG. 2 is diagram illustrating a method 200 for entry to HIB8 and exit from the HIB8, according to certain embodiments. FIG. 200 includes a reference clock (REF_CLK), a LINE, and a finite state machine (FSM) State. Each of the elements are affected by HIB8 mode (i.e., HIBERN8) as shown in FIG. 2.

Before the host, such as the host device 104 of FIG. 1, requests a storage device, such as the storage device 106 of FIG. 1 to enter into HIB8 mode, the FSM state is either disabled, sleep, or stalled. To enter into HIB8 mode, the host device must first stop the REF_CLK. Once the REF_CLK is stopped the storage device enters HIB8 mode. When the device is ready to exit HIB8 mode the REF_CLK is turned back on. The REF_CLK is on for a short period of time before the HIB8 exit request. The squelch (SQ-RX) will have to detect the HIB8 exit request amongst other storage device noises so the squelch has to work extremely hard to make the detection of the line change (DIFF_N). Once the HIB8 exit request is detected the T Activate gives the storage device up to 100 microseconds to exit HIB8 mode. Once out of HIB8 mode the storage device is now ready for burst.

Stated another way, the host device should enable the REF_CLK for t1 time. After the REF_CLK is enabled for t1, the host device should drive the lines to DIFF_N for min_T_Activate time (MIPI SPEC, 'RX_Min_ACtivate-Time_Capability). Upon the data storage device RX detecting by the SQ-RX block, the DIFF_N drives by the host TX, the data storage device should power up all internal power domain and prepare to START-OF-BURST that will be followed by the host device. Upon the data storage device RX detect the HIB_EXIT mentioned above, the data storage device TX should do the same: drive the data storage device TX line to DIFF_N for min T_activate time as MIPI SPEC capability defines. The exit from HIB8 (DIFF_Z) for T_activate time, both from host-TX→device RX and device TX→host-RX, after REF_CLK is enabled which is not reflected on the MIPI Spec.

Figure 3:
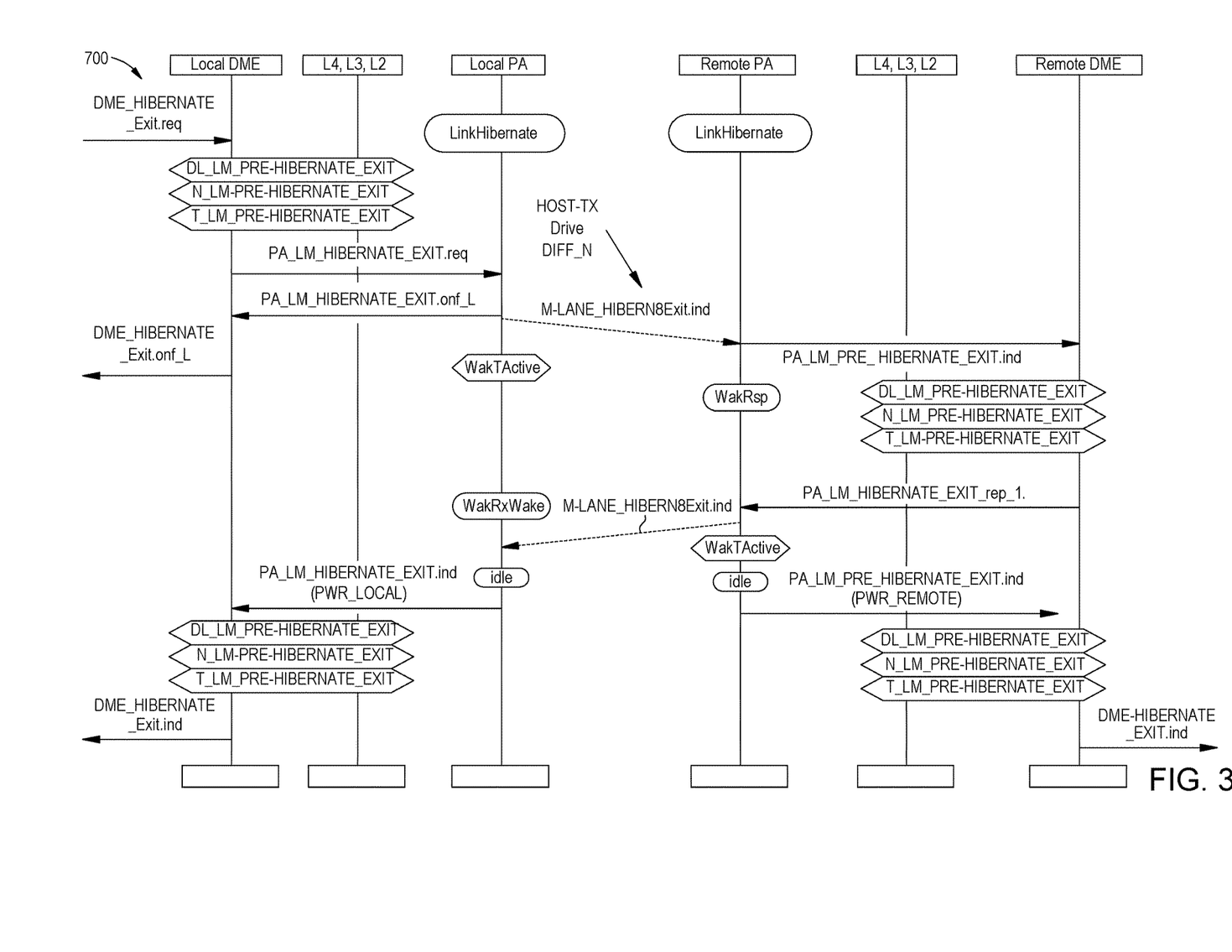
FIG. 3 is a flow chart illustrating a method for flow defined in the MIPI, according to certain embodiments.

FIG. 3 is a flow chart illustrating a method 300 for flow defined in the MIPI spec, according to certain embodiments. In the previous approach to exit HIB8 mode, the data storage device must wait for the squelch (HOST_TX Drive) to detect the HIB8 exit request from the host once the REF_CLK is turned back on before exiting HIB8 mode. At that point, the data storage device would wake up and begin the HIB8 exit process. At detection from the squelch, the T_Active timer beings as the HIB8 exit request proceeds.

Method 300 begins with the host device sending a message to the local device management entity (DME) to send out DME_HIBERNATE_EXIT.req to exit HIB8 mode. To prepare to exit HIB8 mode commands DL_LM_PRE_HIBERNATE_EXIT, N_LM_PRE_HIBERNATE_EXIT, and T_LM_PRE_HIBERNATE_EXIT are sent out from the data link layer (DL), the network layer (N), and the transport layer (T) of the local stack (L4-L2). The local DME will then send PA_LM_HIBERNATE_ENTER.req to the local physical adapter (PA) of the storage device. The PA shall use PA_LM_HIBERNATE_EXIT.cnf_L to confirm the HIB8 exit request with the local DME.

When HOST_TX Drive detects a difference in DIFF_N, the DIFF_N wakes up starts the T_Active timer and uses M-LANE_HIBERN8Exit.ind to notify the remote PA to issue PA_LM_PRE_HIBERNATE_EXIT.ind to the remote DME. To prepare to exit HIB8 mode commands DL_LM_PRE_HIBERNATE_EXIT, N_LM_PRE_HIBERNATE_EXIT, and T_LM_PRE_HIBERNATE_EXIT are sent out from the respective layers of the remote stack (L4-L2). The layers prepare to exit HIBB8 mode and the remote DME sends PA_LM_PRE_HIBERNATE_EXIT.rsp_L to the remote PA.

The DEVICE_TX Drive detects the difference in DIFF_N which turns of the T_Active timer. The command M-LANE_HIBERN8Exit.ind is sent from the remote PA to the local PA to issue PA_LM_PRE_HIBERNATE_EXIT.ind (PWR_LOCAL) to the local DME. Also, the remote PA will send PA_LM_HIBERNATE_EXIT.ind(PWR_REMOTE) to the remote DME on receipt of M-LANE_HIBERN8Exit.ind to the local PA. On receiving PA_LM_PRE_HIBERNATE_EXIT.ind (PWR_LOCAL) to the local DME and receiving PA_LM_HIBERNATE_EXIT.ind (PWR_REMOTE) to the remote DME the DL layer, the N layer, and T layer will prepare to exit HIB8 mode. Both the local DME and the remote DME will send DME_HIBERNATE_EXIT.ind to the host device or the data storage device respectively.

Figure 4:
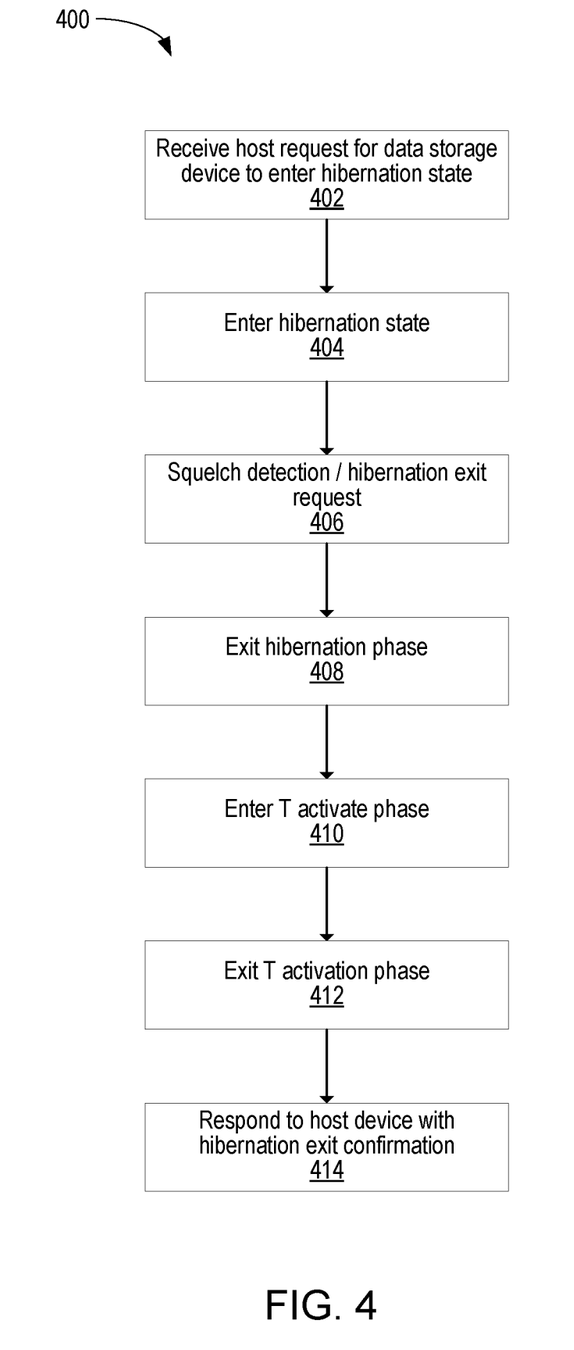
FIG. 4 is schematic flowchart illustrating a method for exiting HIB8, according to certain embodiments.

FIG. 4 is schematic flowchart illustrating a method for existing HIB8, according to certain embodiments. Method 400 begins at block 402. At block 402, the data storage device receives a request from the host to enter HIB8 state. At block 404, the data storage device enters HIB8 state. At block 406, the squelch detection occurs which is an indication of a HIB8 exit request. The request to exit HIB8 mode is sent after the REF_CLK has been turned on. The request to exit HIB8 is sent from the host to the data storage device. The squelch detection of the HIB8 exit request occurs when the DIFF_N has changed. At block 408, the data storage device begins exiting the HIB8 phase. Exiting the HIB8 phase includes waking up the data storage device and prepping layers to exit HIB8 mode. The layers may include the DL layer, the N layer, and the T layer. At block 410, the data storage device enters the T_Active phase. The T_Active phase is the time it takes for the data storage device to exit HIB8 mode. At block 412, the data storage device exits T-Active phase. The device will exit the T_Active phase when the data storage device exits HIB8 mode. At block 414, the data storage device responds to the host with a HIB8 exit confirmation.

Figure 5:
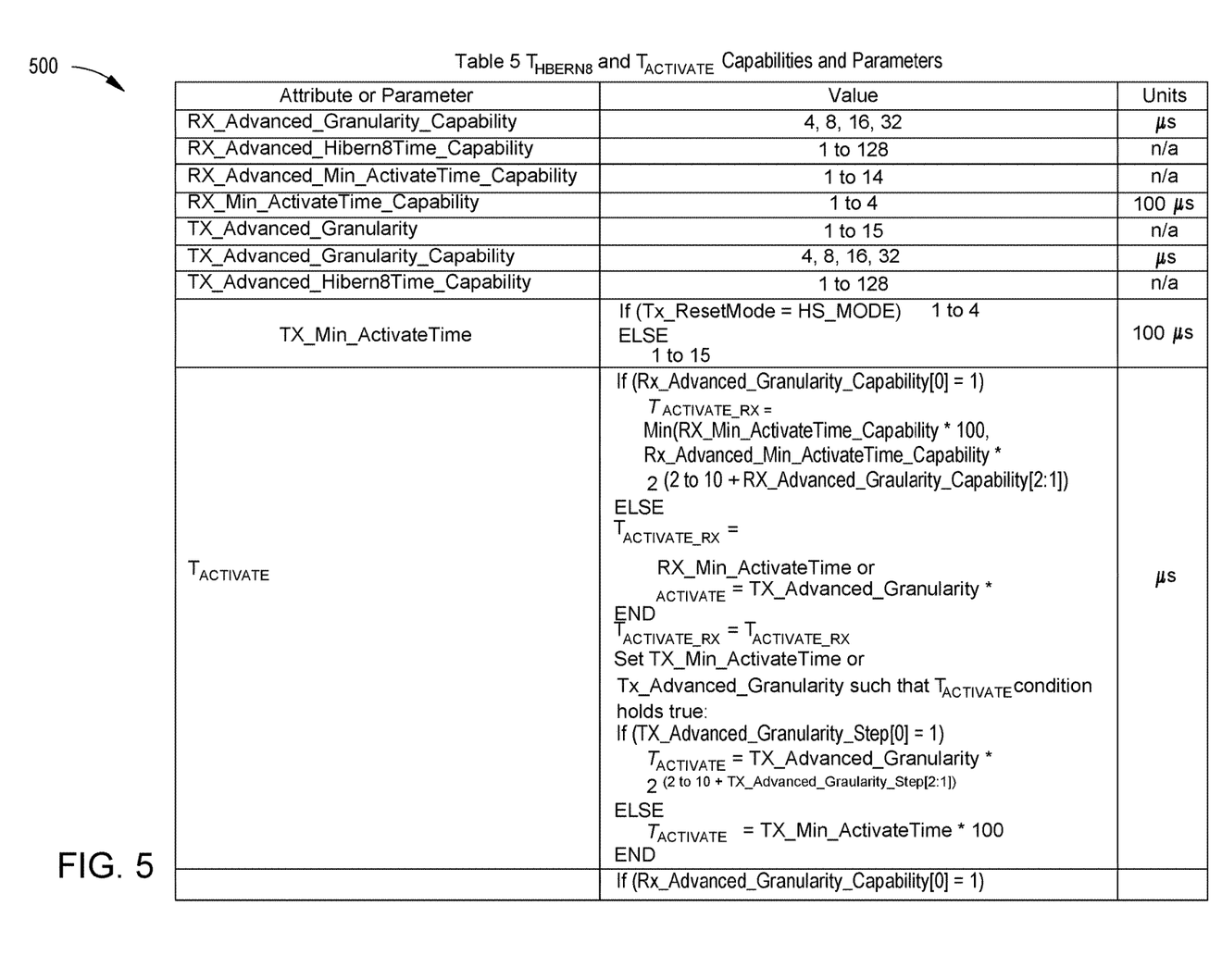
FIG. 5 is a table illustrating the capabilities of the T HIB8 and T Activate, according to one embodiment.

FIG. 5 is a table 500 illustrating the capabilities and parameters during HIB8, according to one embodiment. Table 500 is a guide for the different values of T_Hibern8 and T_Active. Each parameter is given a value. The unit given to most the parameters is also displayed on table 500. For example the minimum active time for T_Active is 100 microseconds. T_Active may be calculated by using the formula along with the value of T_Hibern8.

Figure 6A:
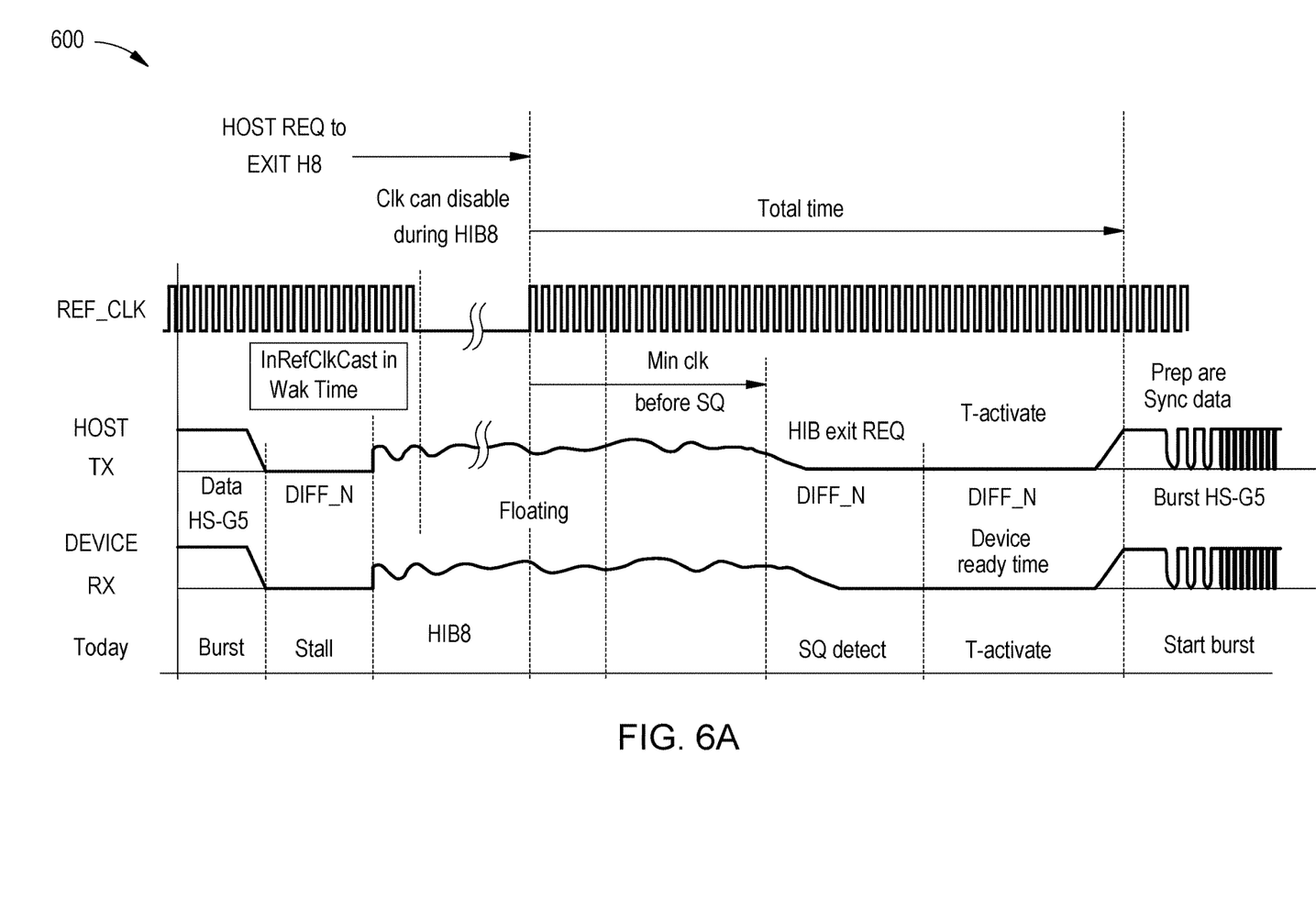
FIG. 6A is a flow diagram illustrating a method for an HIB8 exit, according to certain embodiments.

FIG. 6A is a flow diagram illustrating a method 600 for an HIB8 exit, according to certain embodiments. Method 600 begins with a running REF_CLK until a data storage device is in HIB8 mode. The host then requests that the data storage device exit HIB8 mode. The DIFF_N prior to the HIB8 exit request is stalled. During the HIB8 mode, the DIFF_N is in a floating state. During the floating state before the request to exit HIB8 mode is sent, the REF_CLK is turned off. The REF_CLK is then turned back on and the host then requests to exit HIB8 mode. The REF_CLK is floating before the squelch detects a change in the DIFF_N. Once the change is detected by the squelch the HIB8 exit request is received by the data storage device and the DIFF_N is out of the floating state. Once the DIFF_N exits the floating state, the T-Active timer is started and stopped once the data storage device is prepped to exit HIB8 mode. The total time is consider the time the REF_CLK is turned back on to the time the data storage device is finished prepping to exit HIB8 mode.

As discussed herein, exiting the HIB8 state earlier by enabling fast HIB confirmation and indication from the data storage device to the host device is disclosed. The disclosure shows how to detect HIB8 exit in the data storage device/ASIC by detecting the REF-CLK and not by the squelch-detection (SQ-RX) consuming the t-activate time as MIPI SPEC defines. By detecting the REF-CLK, the SQ-RX is dropped and the UFS line sensors, and any analog stub which can be critical while increasing gears) are released with enabling the detection on the REF-CLK detection logic.

Generally, there is no change on the UFS host device interface lines and the HIB8 exit time boost is relevant for high speed gear modes while the REF-CLK is mandatory on HIB8 exit flow. Low speed modes, in contrast, are going to be dropped by the MIPI spec in the near future which necessarily means detecting the REF-CLK will be valuable for all UFS devices in the very near future.

Figure 6B:
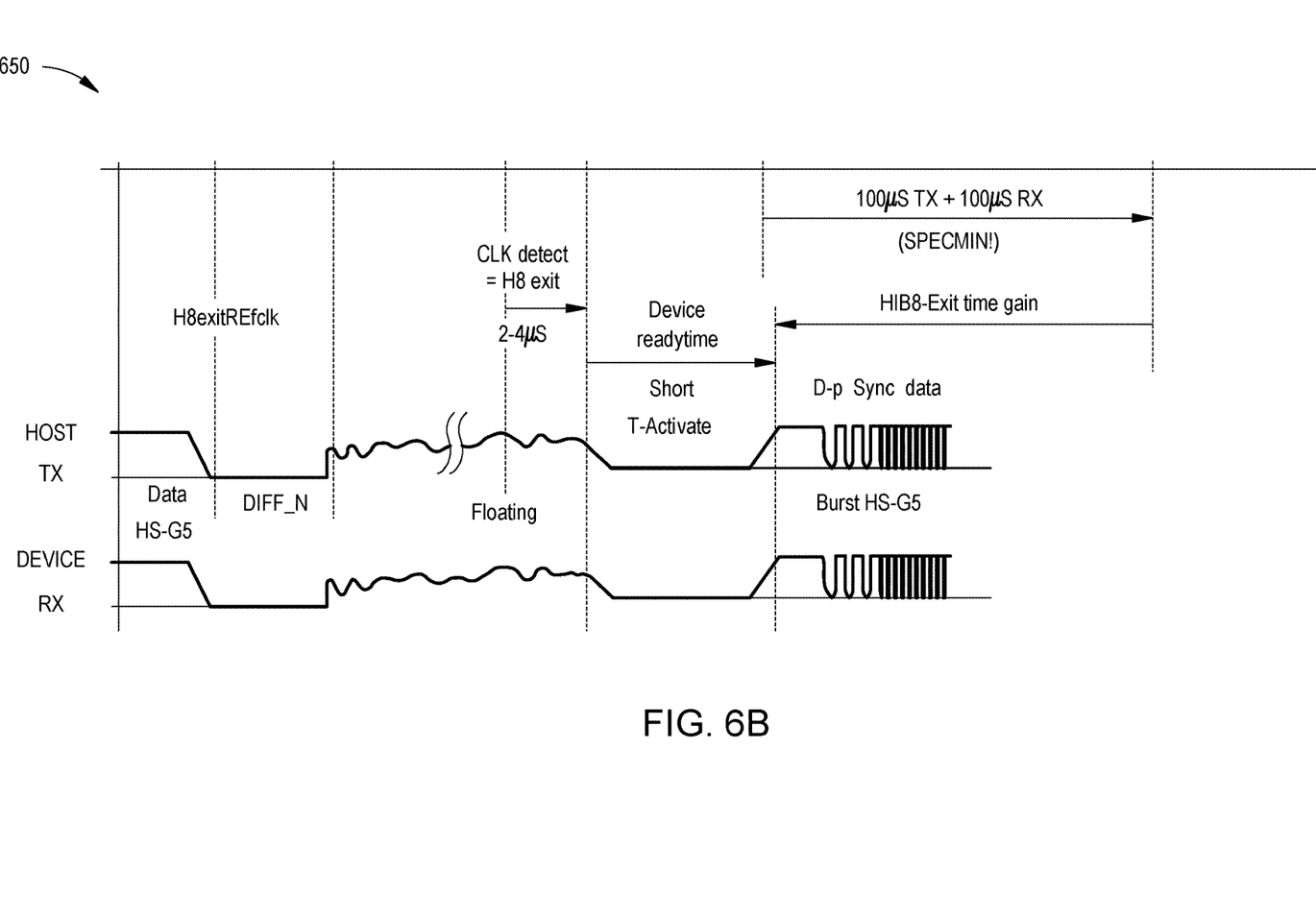
FIG. 6B is a flow diagram illustrating a method for the time gained for an HIB8 exit, according to certain embodiments.

FIG. 6B is a flow diagram illustrating a method 650 for the time gained for an HIB8 exit, according to certain embodiments. Method 650 begins with monitoring the REF_CLK. As in method 600, there is a running REF_CLK while a sleep data storage device is sleep. A host then requests that the data storage device exit HIB8 mode. The DIFF_N prior to the HIB8 exit request is stalled. During the floating state before the request to exit HIB8 mode is sent the REF_CLK is turned off. The REF_CLK is being monitored for when the REF_CLK is turned back on. The REF CLK is then turned back on. The REF CLK turn on is detected in 2-4 microseconds, so the HIB8 exit preparation begins immediately. The T_Active timer is started but the data storage device is ready in a shortened period of time so the T_Active time is turned off. The signal to exit HIB8 mode was triggered by the REF_CLK being turned back on. The time to prepare and exit HIB8 mode in method 650 is within 1-2 microsecond of the time taken for the data storage device to receive the HIB8 exit request of method 600. Method 650 saves more than half the time using the REF_CLK as a signal to begin exiting HIB8 mode as compared to method 600. In method 650 the host does have a chance to send the HIB8 exit request before the data storage device already exits HIB8 mode. It is to be understood though in method 650 the HIB8 mode exit request was not sent before exiting HIB8 mode, other examples may send the request to exit HIB8 mode before exiting HIB8 mode. No matter when the HIB8 mode exit request is sent, the use of the REF_CLK as signal will be faster exiting HIB8 mode.

Looking at the application flow in FIG. 6B, the time gain occurs by detecting the REF-CLK signal early. The data storage device can power up internal domain and bring the data storage device to be ready in advance. The data storage device can respond with HIB_exit indication immediately (i.e., the data storage device-TX will drive to DIFF_N immediately when the host-TX drives to DIFF_N. The t-activate can be even a few nanoseconds or even 0. The data storage device can immediately respond with HIB8 exit confirmation while the data storage device detects the REF-CLK and not another state such as the squelch detection or the t-activate phases.

Figure 7:
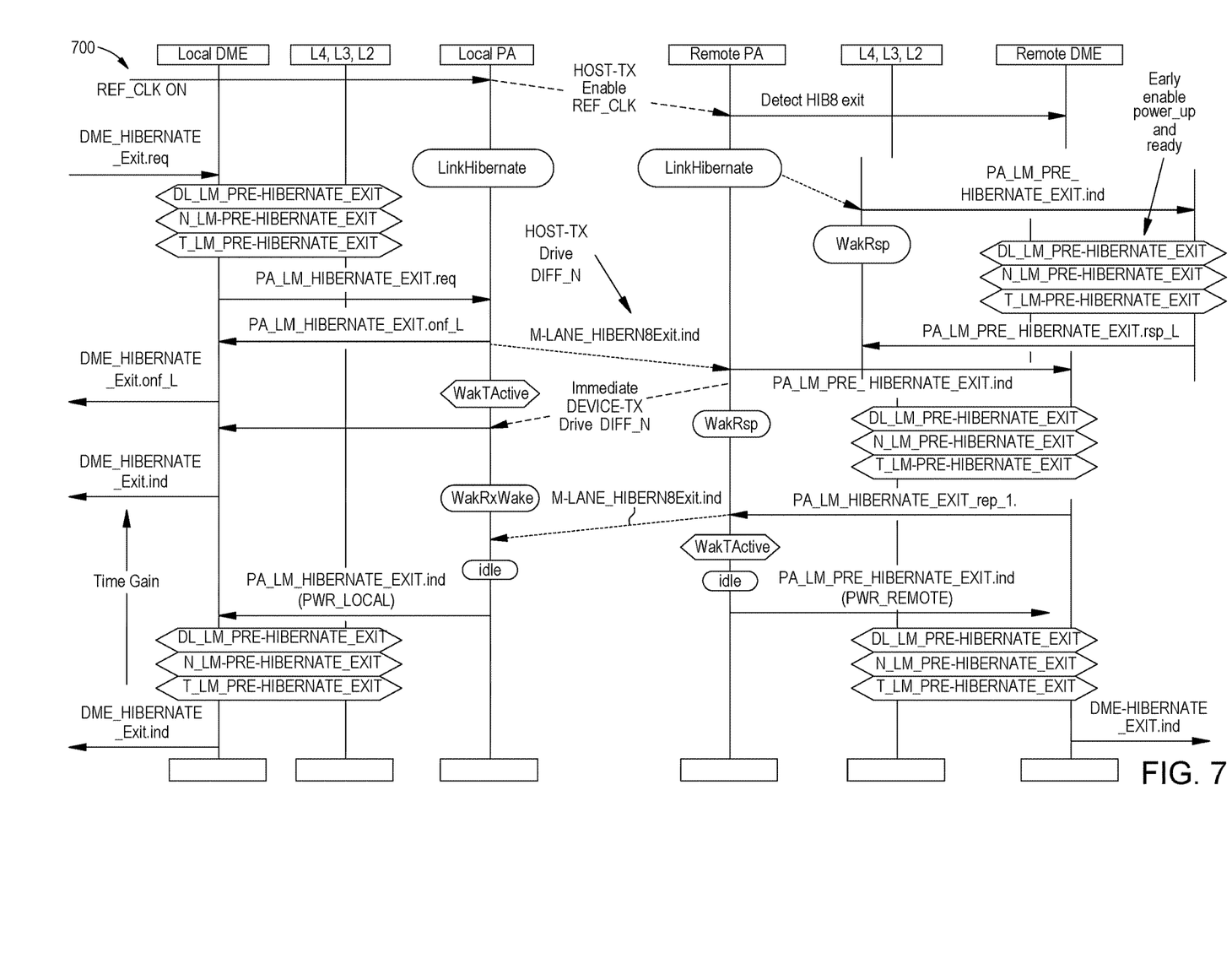
FIG. 7 is a flow chart illustrating a method for flow defined in the MIPI, according to certain embodiments.

FIG. 7 is a flow chart illustrating a method 700 for flow defined in the MIPI spec, according to certain embodiments. In the current approach to exit HIB8 mode the data storage device does not have to wait for the squelch to detect the HIB8 exit request from the host. Instead, the host turns on the REF_CLK, which is detected by the remote PA. The remote PA then signals the remote DMA to enable early power up to begin to exit HIB8 mode before the HIB8 exit request is sent from the host. Starting the HIB8 exit process at the signal of the REF-CLK turn on will save time as seen in FIG. 7.

Method 700 begins with the host device sending REF_CLK_ON to the local PA. The HOST_TX enables the REF_CLK to turn on. The remote PA detects the HIB8 exit from the REF_CLK being turned on and send the detection information to the remote DME. The remote DME enables early power_up and ready's the data storage device.

To prepare to exit HIB8 mode, commands DL_LM_PRE_HIBERNATE_EXIT, N_LM_PRE_HIBERNATE_EXIT, and T_LM_PRE_HIBERNATE_EXIT are sent out from the respective layers of the remote stack (L4-L2). The layers prepare to exit HIBB8 mode and the remote DME sends PA_LM_PRE_HIBERNATE_EXIT.rsp_L to the remote PA. Immediately after the DEVICE_TX Drive detects a difference in the DIFF_N. The T_Active timer then starts and the local PA wait for wake up. The local DME then sends DME_HIBERNATE_EXIT.ind to the host device. The MIPI HIB8 exit flow can be updated and reduce the T_Active time. Since the host is the only one to initiate the HIB8 exit there is no need to wait for the squelch detection on the host or device side. The host can immediately be ready and wait for the response command from the device, without the need to wait the host side squelch detection.

Based upon the above, the MIPI HIB8 exit flow can be updated to reduce the T-ACTIVE time. Since the host device is the only one initiating the HIB8 exit, there is no need for SQ detection on any side. The host device can immediately be ready and wait for the response command from the data storage device without the need to wait for the host side SQ detection. As such, the SQ-RX analog block will no longer be needed and can be removed from the ASIC.

By using the reference clock a device can exit the HIB8 mode earlier than in previous approaches. The device total HIB8 exit time is decreased, which is valuable to performance in the current market. There will be no mandatory specification upgrade or change by using this approach. The physical squelch logic and circuitry may be removed from the physical design.

In one embodiment, a data storage device comprises: a memory device; and a controller coupled to the memory device, wherein the controller is configured to: detect a reference clock signal has been activated by a host device; and in response to the detection, exit a hibernation state. A host transmission (Tx) line is floating at a time of the detection. A data storage device transmission (Tx) line is floating at a time of the detection. Exiting the hibernation state comprises powering up components of the data storage device. Powering up components comprises a burst on a data storage device transmission (TX) line. The controller is further configured to inform the host device that the data storage device has exited the hibernation state. The detecting occurs between about 2 microseconds to about 4 microseconds from a beginning of the clock signal being activated. The controller is further configured to detect a host device transmission (TX) line has been driven to DIFF_N. The controller is further configured to drive a data storage device TX line to DIFF_N upon the detecting the host device TX line being driven to DIFF_N. A data storage device time to activate (T-Activate) is between about 0 seconds and about 10 microseconds.

In another embodiment, a data storage device comprises: a memory device; and a controller coupled to the memory device, wherein the controller is configured to: enter a hibernation state at request of a host device, wherein while in the hibernation state a data storage device transmission (Tx) line is floating; detect a reference clock signal is activated; begin to activate data storage device for a data storage device activation time period (T-Activate); execute a burst on the data storage device TX line; and inform the host device that the data storage device has exited the hibernation state. T-Activate for the data storage device occurs prior to a host device T-Activate. The data storage device T-Activate is longer than the host device T-Activate. The data storage device T-Activate begins while a host device Tx line is floating. The informing occurs less than 100 microseconds after the detecting. The executing a burst occurs substantially simultaneous with a burst on a host device Tx line. The data storage device T-Activate is up to about 5 nanoseconds.

In another embodiment, a data storage device comprises: memory means; and a controller coupled to the memory means, wherein the controller is configured to: detect a change in a reference clock signal; begin a time to activation (T-Activate) state on a data storage device transmission (Tx) line; execute a burst on the data storage device Tx line; and drive the data storage device Tx line to DIFF_N. The detecting comprises detecting a reference clock signal to exist. During the detecting the data storage device Tx line is floating.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
monitor a reference clock while in a hibernation state;
detect that the reference clock has been turned off;

detect that the reference clock signal has been activated by a host device; and in response to the detection, exit the hibernation state without waiting on squelch detection.

2. The data storage device of claim 1, wherein a host transmission (Tx) line is floating at a time of the detection.

3. The data storage device of claim 1, wherein a data storage device transmission (Tx) line is floating at a time of the detection.

4. The data storage device of claim 1, wherein exiting the hibernation state comprises powering up components of the data storage device.

5. The data storage device of claim 4, wherein powering up components comprises a burst on a data storage device transmission (TX) line.

6. The data storage device of claim 1, wherein the controller is further configured to inform the host device that the data storage device has exited the hibernation state.

7. The data storage device of claim 1, wherein the detecting occurs between about 2 microseconds to about 4 microseconds from a beginning of the clock signal being activated.

8. The data storage device of claim 1, wherein the controller is further configured to detect a host device transmission (TX) line has been driven to DIFF_N.

9. The data storage device of claim 8, wherein the controller is further configured to drive a data storage device TX line to DIFF_N upon the detecting the host device TX line being driven to DIFF_N.

10. The data storage device of claim 1, wherein a data storage device time to activate (T-Activate) is between about 0 seconds and about 10 microseconds.

11. A data storage device, comprising:
a memory device; and
a controller coupled to the memory device, wherein the controller is configured to:
    enter a hibernation state at request of a host device, wherein while in the hibernation state a data storage device transmission (Tx) line is floating;
    monitor a reference clock while in the hibernation state;
    detect that the reference clock has been turned off;
    detect that the reference clock signal is activated;
    begin to activate data storage device for a data storage device activation time period (T-Activate);
    execute a burst on the data storage device TX line; and
    inform the host device that the data storage device has exited the hibernation state without waiting on squelch detection.

12. The data storage device of claim 11, wherein T-Activate for the data storage device occurs prior to a host device T-Activate.

13. The data storage device of claim 12, wherein the data storage device T-Activate is longer than the host device T-Activate.

14. The data storage device of claim 11, wherein the data storage device T-Activate begins while a host device Tx line is floating.

15. The data storage device of claim 11, wherein the informing occurs less than 100 microseconds after the detecting.

16. The data storage device of claim 11, wherein the executing a burst occurs substantially simultaneous with a burst on a host device Tx line.

17. The data storage device of claim 11, wherein the data storage device T-Activate is up to about 5 nanoseconds.

18. A data storage device, comprising:
memory means; and
a controller coupled to the memory means, wherein the controller is configured to:
    monitor a reference clock while in a hibernation state;
    detect that the reference clock has been turned off;
    detect a change in a reference clock signal and begin exiting hibernation without waiting on squelch detection, wherein the change in the reference clock is the reference clock being activated;
    begin a time to activation (T-Activate) state on a data storage device transmission (Tx) line;
    execute a burst on the data storage device Tx line; and
    drive the data storage device Tx line to DIFF_N.

19. The data storage device of claim 18, wherein the detecting comprises detecting a reference clock signal to exist.

20. The data storage device of claim 18, wherein during the detecting the data storage device Tx line is floating.

* * * * *